United States Patent [19]

Bertagnolli et al.

[11] Patent Number: 5,472,916
[45] Date of Patent: Dec. 5, 1995

[54] METHOD FOR MANUFACTURING TUNNEL-EFFECT SENSORS

[75] Inventors: Emmerich Bertagnolli; Markus Biebl, both of Munich, Germany

[73] Assignee: Siemens Aktiengesellschaft, Munich, Germany

[21] Appl. No.: 217,854

[22] Filed: Mar. 25, 1994

[30] Foreign Application Priority Data

Apr. 5, 1993 [DE] Germany .......................... 43 11 121.1

[51] Int. Cl.⁶ ................................................ H01L 21/311
[52] U.S. Cl. .......................... 437/228; 437/72; 437/974; 156/653.1
[58] Field of Search ..................... 437/228, 974, 437/72; 148/DIG. 135; 156/653, 651

[56] References Cited

U.S. PATENT DOCUMENTS

| 4,561,932 | 12/1985 | Gris et al. | 156/653 |
|---|---|---|---|
| 4,638,669 | 1/1987 | Chou . | |
| 4,874,463 | 10/1989 | Koze et al. | 156/651 |
| 4,943,343 | 7/1990 | Bardai et al. | 156/653 |
| 5,266,530 | 11/1993 | Bagley et al. | 437/228 |
| 5,358,908 | 10/1994 | Reinberg et al. | 437/228 |

FOREIGN PATENT DOCUMENTS

| 0150885 | 8/1985 | European Pat. Off. . | |
|---|---|---|---|
| 0434330 | 6/1991 | European Pat. Off. . | |
| 5249772 | 4/1977 | Japan | 437/228 |
| WO87/07729 | 12/1987 | WIPO . | |

OTHER PUBLICATIONS

"A Theoretical Study on Field Emission Array for Microsensors", Lee, et al IEEE Transactions on Electron Devices, vol. 39, No. 2, Feb. 1992, pp. 313–324.
"Self–Aligned Silicon Field Emission Cathode Arrays Formed by Selective Lateral Thermal Oxidation of Silicon", J. P. Spallas, et al, J. Vac. Sci, Technol. B 11(2), Mar./Apr. 1993, pp. 437–440.
"Properties of Polysilicon Films Annealed by a Rapid Thermal Annealing Process" Ristic, et al, Thin Solid Films 220 (1992) 106–110.
"Electron Tunnel Sensors" Kenny et al. J. Vac. Sci, Technol. Jul./Aug. 1992, pp. 2114–2118.
"Micromachined Silicon Tunnel Sensor for Motion Detection", Kenny et al. Appl. Phys. Lett 58, 7, Jan. 1991, pp. 100–102.

Primary Examiner—Tom Thomas
Assistant Examiner—Michael Trinh
Attorney, Agent, or Firm—Hill, Steadman & Simpson

[57] ABSTRACT

In a method for manufacturing tunnel-effect sensors, a tip (2) composed of the silicon of the substrate (1) is produced on a substrate (1) of silicon with electrically conductively doped regions (4) by oxidation of the silicon using a nitride mask on the surface. Using the planarized oxide layer (5) produced in the oxidation step, a beam (3) of polysilicon that is anchored on the substrate (1) is applied, for example, over the tip (2) as a cooperating electrodes for the utilization of the tunnel effect and is electrically conductively doped. Subsequently, the oxide layer (5) is removed.

6 Claims, 3 Drawing Sheets

METHOD FOR MANUFACTURING TUNNEL-EFFECT SENSORS

BACKGROUND OF THE INVENTION

The present invention is directed to a manufacturing method for tunnel-effect acceleration sensors on silicon. Modern navigation systems require small, simply manufacturable and reliable acceleration sensors having a measuring precision in the region of one-millionth of the acceleration due to gravity. It is also required in other sensors such as, for example, in microphones and pressure sensors to define a chronologically variable path difference with extremely high precision given movably attached parts. This is possible upon utilization of the tunnel effect. In such sensors as disclosed, for example, by T. W. Kenny et al in Appl. Phys. Lett. 58, 100–102 (1991) and J. Vac. Sci. Technol. A 10 (4), 2114–2118 (1992), the tunnel effect between a tip located on a moveable beam and the silicon substrate is utilized for the measurement.

SUMMARY OF THE INVENTION

It is an object of the present invention to provide a simplified method for manufacturing improved embodiments of such tunnel effect sensors.

This object is achieved with a method for manufacturing tunnel-effect sensors on a substrate of silicon. The substrate is provided with a structure of electrical conductors produced by doping, whereby a tip of silicon is produced on this substrate. In a first step, a thin layer at the surface of the substrate is oxidized to form a pad oxide layer. In a second step, a mask of a material that prevents the passage of oxygen is produced. In a third step upon employment of this mask, a layer at the surface of the substrate is oxidized to form an oxide layer, so that the tip arises under the mask. In a fourth step, the mask is removed, and in a fifth step, the oxide layer is removed.

In a further development of the present invention further steps are provided between the first and second steps. In a first, further step, a first mask of a material that prevents the passage of oxygen is applied onto the pad oxide layer and is structured. In a second further step, upon employment of this first mask, a layer at the surface of the substrate is then oxidized to form a first oxide layer. In a third further step, this first oxide layer is then nearly completely isotropically removed, but such that the first mask remains in place. In a fourth further step, a further pad oxide layer is then produced, and the second step is then implemented in that a layer of a material that prevents the passage of oxygen is isotropically applied surface-wide and is structured.

In another development of the present invention this pad oxide layer and a layer-like portion at the surface of the substrate to the side of this mask are removed between the second and the third steps.

Furthermore, this oxide layer can be planarized between the fourth step and the fifth step. Also, a polysilicon layer is applied and is removed to such an extent before the fifth step that a beam anchored to the silicon of the substrate remains over the tip.

Given the method of the present invention, the tunnel tip of the sensor is produced on the surface of a silicon substrate. The region of the surface of the substrate provided for the tip is covered with an oxygen-impermeable mask, for example nitride, and the silicon is oxidized to the side of this mask. What the various exemplary embodiments of the method of the present invention set forth below have in common is that the shape of the substrate surface is fashioned before or after the application of this mask such that the boundary surface between the arising oxide layer and the remaining silicon of the substrate forms a tip under the mask as a result of the oxidation process. This shaping of the substrate surface can ensue, for example, on the basis of a primary oxidation step before the manufacture of the mask employed for the further oxidizing. Instead of this, a mesa can be etched into the substrate upon employment of this mask after the application and structuring of the mask. The subsequent oxidation process then likewise supplies a desired result. An arbitrary material that prevents the passage of oxygen can be respectively employed as mask in the oxidation steps. For example, the material can be $Si_3N_4$, for which reason the material is referred to as nitride for the sake of simplicity in the rest of the specification. $SiO_2$ arises in the oxidation of the silicon. This oxidation can ensue, for example, in a hot oxygen atmosphere. Adequate layer thicknesses for the oxide layer are obtained at the substrate surface under, for example, water steam at 950° C. through 1000° C. over a duration of, for example, 6 hours. The $SiO_2$ can be removed for example by wet-chemical etching or with the HF plasma, $4H+4F+SiO_2$, $2H_2O$ and $SiF_4$ derive. These method steps for treating the silicon or silicon oxide are intrinsically known and are correspondingly utilized in the manufacturing method of the invention.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

The tunnel-effect sensor manufactured with the method of the present invention utilizes the possibility of measuring minutest path differences of a movably arranged part with the assistance of the tunnel effect. In an acceleration sensor, for example, an electrically conductively doped silicon beam has one end anchored to a substrate of silicon. The beam is bendable and a bending of this beam that is dependent of the size of the acceleration occurs given an acceleration arising perpendicular to the substrate surface. This bending is identified with extreme precision by a tunnel electrode located under the beam. The tunnel electrodes are formed by the beam and by a tip on the surface of the substrate that is located under the beam and is directed thereat. An electrically conductive structure for the electrical terminals is fashioned in the substrate by doping. A potential can be applied via this conductive structure between the tunnel tip and the conductor silicon beam via the anchoring thereof on the substrate. Further electrodes in the substrate and in the beam or in the beam and in a further (poly) silicon layer upwardly covering the sensor serve the purpose of compensating an occurring acceleration of the beam with an electro-static force. What this means for the electronic circuit provided for the control is that the tunnel current between the beam and tip is held to a constant value. The required compensation voltage is a direct measure for the occurring acceleration.

Since even the minutest bendings of the beam lead to a great change in the tunnel current, this method is suited for measuring accelerations with extremely high precision. The application of the described compensation method makes it possible to expand the range of measurement from one one-millionth of the acceleration due to gravity up to 100 times the acceleration due to gravity. The manufacture of tunnel tip, bending beam and electrodes occurs with process steps of micro-mechanics that are compatible with the technology of manufacturing integrated circuits. This has the advantage that the electronic circuit for control and evaluation can be integrated on a semiconductor component together with the actual sensor and the precision and the signal-to-noise ratio of the sensor are therefore significantly improved.

Figure 1:
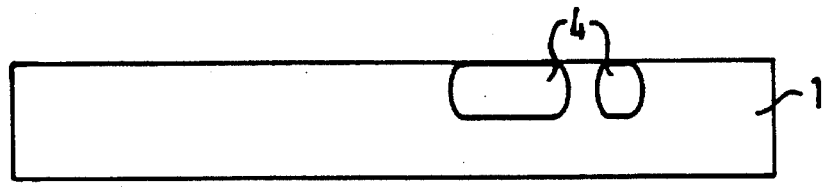
FIGS. 1–4 show an inventively manufactured tunnel-effect acceleration sensor in cross-section after various stages of the manufacturing method.
Figure 2:
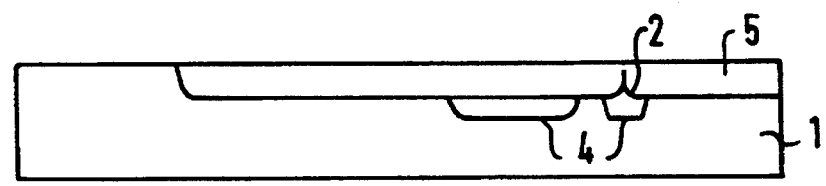

In the manufacture of, for example, the described acceleration sensor, a substrate 1 of silicon is doped at the surface according to the required structure of electrical conductors 4. Particularly included among these conductors 4 are doped regions that are provided for the tip to be manufactured and for a compensation electrode, as shown in FIG. 1. The tip 2 is manufactured as tunnel electrode on the doped surface of the substrate, for example, in a method set forth later. In a method of the present invention, this tip 2 (by contrast to previously standard methods) is manufactured directly from the material of the original substrate 1. An oxide layer 5 covers this tip 2 and planarizes the surface. As shown in FIG. 2, the tip 2 is covered by this oxide layer 5 to such an extent that the distance between the tip and the beam to be manufactured is defined by the thickness of the oxide layer 5. A polysilicon layer is deposited surface-wide thereon, this being connected to an electrically conductively doped region of the substrate 1 for an electrical terminal. This connection to the silicon of the substrate 1 can be produced, for example, in that openings in the oxide layer 5 are etched at the appropriate locations before the application of this polysilicon layer.

Figure 3:
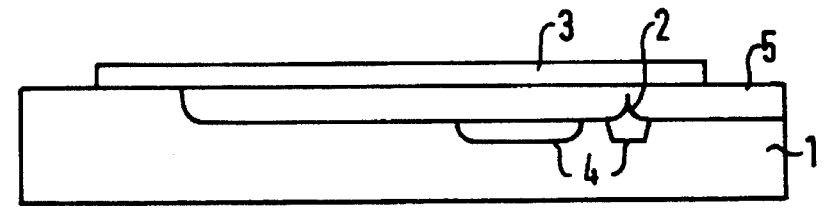
Figure 4:
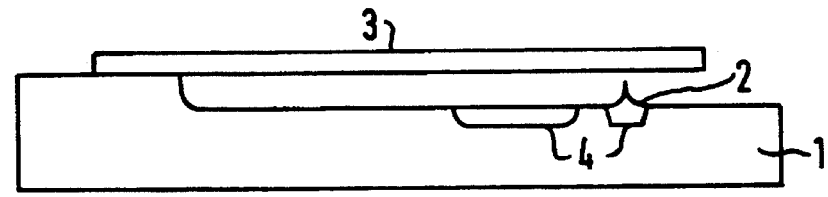

When, as shown in FIG. 3, the oxide layer 5 occupies only a part of the substrate surface and the silicon of the substrate 1 is free at the surface outside the oxide layer 5, it is adequate to apply the polysilicon layer surface-wide. This polysilicon layer is structured, so that the beam in FIG. 3 remains, this being anchored on the surface of the substrate 1. After the removal of the oxide layer 5, the freely moveable beam 3 resides freely over the tip 2 at a small distance from this tip 2, as shown in FIG. 4. The method of the present invention is suitable not only for this specific acceleration sensor but for any sensor wherein a tunnel electrode is arranged on the substrate as a tip.

Figure 5:
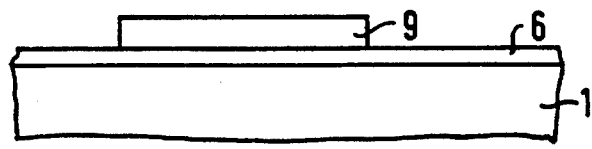
FIGS. 5–10 show further steps of the manufacturing method that are undertaken between the steps depicted in FIG. 1 and FIG. 2.
Figure 6:
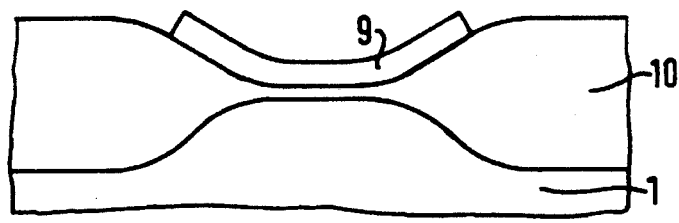
Figure 7:
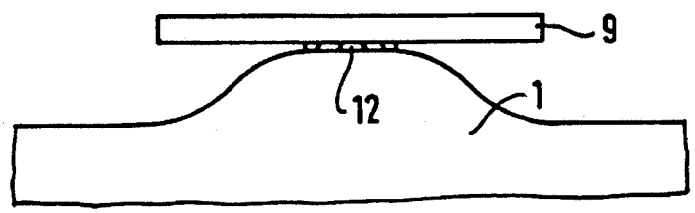
Figure 8:
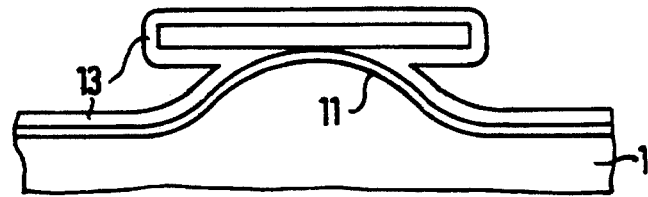

The manufacture of the tip 2 shall now be set forth for two different exemplary embodiments with reference to FIGS. 5-13. Each of the FIGS. 5-13, respectively shows the portion of the substrate around the region doped for the tunnel electrode. The surface of the substrate 1 is first oxidized to form a thin pad oxide layer 6, for example under a hot $O_2$ atmosphere. As shown in FIG. 5, a first mask 9 of nitride is applied onto this pad oxide layer 6 (see, for example, above description). The $SiO_2$ of this pad oxide layer 6 reduces a tension occurring between the silicon of the substrate 1 and this first mask 9 in the following oxidation process. Upon employment of this first mask 9, the surface of the substrate 1 is oxidized and this, for example, can ensue under a water steam atmosphere, as set forth below. The silicon of the substrate 1 on the side of the mask swells in the oxidation process due to the incorporation of the oxygen and forms a first oxide layer 10, as entered in FIG. 6. This first oxide layer 10 is subsequently isotropically removed, for example by wet-chemical etching or with the described plasma process. Due to the isotropic etching, the first oxide layer 10 is also removed under the first mask 9, except for a remaining part 12 (see FIG. 7), so that the first mask 9 remains on the substrate 1. Due to the elasticity of the first mask 9, it at least approximately reassumes the original planar-shape.

Figure 9:
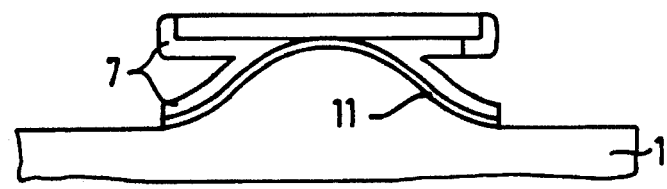
Figure 10:
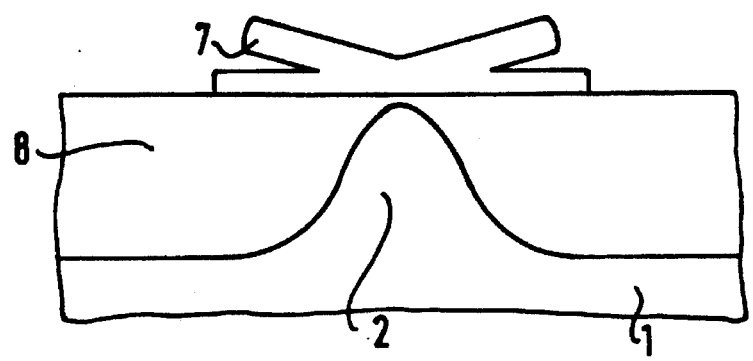

The remainder 12 of the oxide layer is supplemented by a further oxidation to form a surface-wide further pad oxide layer 11. A layer 13 of nitride (in this respect, see the comments above) is isotropically applied surface-wide onto this further pad oxide layer 11. The structure of FIG. 9 is produced from the deriving structure of FIG. 8 by isotropic etching. The nitride is thereby etched off to such an extent that the mask 7 of nitride remains and the silicon of the substrate 1 is uncovered laterally of this mask 7. A remaining part of the further pad oxide layer 11 remains under this mask 7, this again serving the purpose of reducing the tension between the nitride of the mask 7 and the silicon of the substrate 1. The layer 13 can be applied, for example, in that silane ($Si_nH_{2n+2}$) and ammonia ($NH_3$) are chemically converted on the surface of the substrate to form $Si_3N_4$, for example in the vapor phase at 700° C. The mask 7 of FIG. 9 is employed as protection in the following oxidation step. The structure of FIG. 10 results wherein the silicon of the substrate 1 has swelled to an oxide layer 8 to the side of the mask 7. The original silicon of the substrate 1 remains as a tip 2 under the mask 7. Given a suitable selection of the oxidation duration, the surface of this oxide layer 8 is approximately planar. The lateral portions of the mask 7 are pressed upward so that the mask 7 is lent with approximately the shape in FIG. 10.

The structure of FIG. 2 is obtained after the removal of the mask 7. The oxide layer 8 can either be a surface-wide layer or, as shown in FIG. 2, can be limited to a region around the tip 2 as an oxide layer 5 embedded into the substrate surface. Such a limitation is obtained in an obvious way by further masks on the surface of the substrate.

Figure 11:
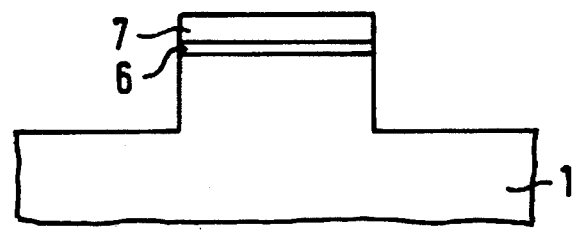
FIGS. 11–13 show alternatives for the manufacturing steps of FIGS. 6–10.
Figure 12:
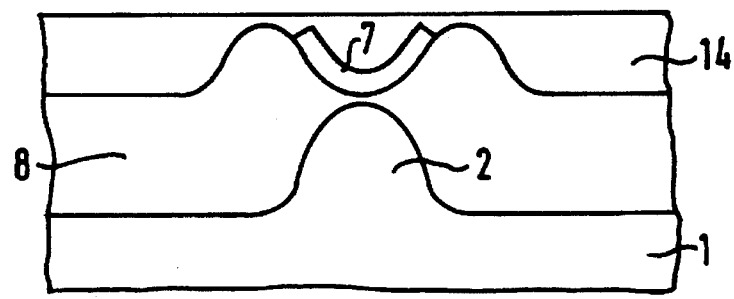
Figure 13:
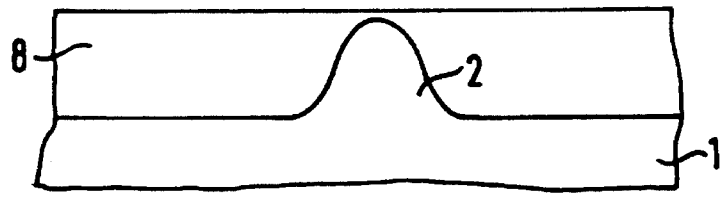

Instead of a two-fold oxidation, it is possible to structure the surface of the substrate to be oxidized such that the tip remaining under the mask in the oxidation is fashioned with adequate prominence. Proceeding on the basis of the structure shown in FIG. 5, the pad oxide layer 6 and a layer-like portion of the silicon lying therebelow at the surface of the substrate 1 are anisotropically removed upon employment of the mask. The mesa shown in cross-section in FIG. 11 is thereby produced in the region of the tip to be manufactured. This mask 7 is the mask 9 of FIG. 5 and also corresponds to the mask of FIG. 9. The structuring of the surface of the substrate 1 is produced here by the mesa etching and not by a preceding oxidation step. The result of a subsequent oxidation step upon employment of the mask 7 is depicted in FIG. 12. The silicon of the substrate 1 is oxidized to form the oxide layer 8 and swells laterally of the mask 7 to form beads, while the silicon of the substrate 1 remains as a tip 2 under the mask 7. The surface of the oxide layer 8, for example, can be mechanically planarized. It is also possible to level the surface with a resist 14 before or after the removal of the mask 7. structure is then uniformly etched back until a planar surface of the oxide layer 8 is uncovered, as in FIG. 13. Care is exercised to ensure that a thin portion of the oxide layer 8 is present over the tip 2 in order to define the distance between the tip 2 and the beam 3 to be manufactured thereabove, as in FIG. 3.

The diameter of the tip to be manufactured can be set via the size (diameter) of the mask 7 and via the duration of the oxidation. The steepness of the sidewalls of the tip can be influenced by the process conditions during the oxidation and, in particular, by the thickness of the previously manufactured pad oxide layer. The planarizing of the oxide layer 8 in FIG. 10 or, respectively, FIG. 13 or, respectively of the oxide layer 5 in FIG. 2 can be omitted when this oxide layer 8, 5 has formed an adequately planar surface during the course of the manufacture of the tip. An additional method step for planarization is in fact only carried out when the oxide layer 8, 5 is not already adequately planar. The polysilicon layer applied surface-wide for the manufacture of the beam 3 is expediently doped before the structuring such that a conductive portion of the beam 3 is present over the tip 2 and at least one conductive connection of this portion to the corresponding terminal via the anchoring of the beam 3 in the substrate 1 is present.

Potentially, one of the compensation electrodes can also be manufactured in the beam 3 above the appertaining cooperating electrode 4 in the substrate. The compensation electrode in the beam 3 can instead be fashioned at that surface of the beam 3 lying opposite the substrate 1 when this beam is outwardly surrounded by a further polysilicon layer. The second compensation electrode is then formed by doping in this outer polysilicon layer. This polysilicon layer can, in particular, be evacuated in order to enhance the free mobility of the beam. As mentioned, the method of the present invention can be applied to arbitrary tunnel effect sensors having a pointed tunnel electrode arranged on the substrate. Instead of the beam, the membrane of a microphone can be formed, for example, by the deposited polysilicon layer, the bending thereof being measured by the variation of the tunnel current under pressure fluctuations as a consequence of the influence of sound. An extremely sensitive microphone can be simply manufactured in the described manner, the membrane motions thereof being capable of being electrostatically compensated by an appropriate bias of the compensation electrodes and this therefore being capable of being utilized in extremely high frequency ranges as well due to the non-occurring attenuation. The manufacturing method of the present invention employs standard processes of semiconductor technology and is therefore also excellently suited in view of the integration of further electronic and mechanical components in a component.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed:

1. A method for manufacturing tunnel-effect sensors on a substrate of silicon, the substrate being provided with a structure of electrical conductors produced by doping, a tip of silicon being produced on said substrate, comprising the steps of:

in a first step, oxidizing a thin layer at a surface of the substrate to form a pad oxide layer;

in a second step, applying and structuring a first mask of a material that prevents passage of oxygen onto the pad oxide layer;

in a third step, upon employment of said first mask, oxidizing a layer at the surface of the substrate to form a first oxide layer;

in a fourth step, nearly completely isotropically removing said first oxide layer, but such that the first mask remains in place;

in a fifth step, providing a further pad oxide layer;

in a sixth step, providing on said pad oxide layer a second mask from a layer of a material that prevents the passage of oxygen, that is isotropically applied surface-wide and that is structured;

in a seventh step upon employment of said second mask, oxidizing a layer at the surface of the substrate to form an oxide layer, so that a tip arises under the second mask;

in an eighth step, removing said second mask; and in a ninth step, removing said oxide layer.

2. The method according to claim 1, wherein said pad oxide layer and a layer-like portion of silicon lying therebelow at the surface of the substrate are removed between the sixth step and the seventh step.

3. The method according to claim 1, wherein a polysilicon layer is applied and is removed to such an extent before the ninth step that a beam anchored to the silicon of the substrate remains over the tip.

4. A method for manufacturing tunnel-effect sensors on a substrate of silicon, the substrate being provided with a structure of electrical conductors produced by doping, a tip of silicon being produced on said substrate, comprising the steps of:

in a first step, oxidizing a thin layer at a surface of the substrate to form a pad oxide layer;

in a first further step, applying and structuring a first further mask of a material that prevents passage of oxygen onto the pad oxide layer, upon employment of said first further mask, oxidizing a layer at the surface of the substrate to form a first oxide layer, nearly completely isotropically removing said first oxide layer, but such that the first further mask remains in place, and providing a further pad oxide layer;

in a second step, providing on said pad oxide layer a mask of a material that prevents passage of oxygen such that a layer of a material that prevents the passage of oxygen is isotropically applied surface-wide and is structured;

in a third step upon employment of said mask, oxidizing a layer at the surface of the substrate to form an oxide layer, so that a tip arises under the ask;

in a fourth step, removing said mask;

in a fifth step, planarizing said oxide layer; and in a sixth step, removing said oxide layer.

5. The method according to claim 4, wherein said pad oxide layer and a layer-like portion of silicon lying therebelow at the surface of the substrate are removed between the second step and the third step.

6. The method according to claim 4, wherein a polysilicon layer is applied and is removed to such an extent before the fifth step that a beam anchored to the silicon of the substrate remains over the tip.

* * * * *